United States Patent
Perrin

[15] 3,643,112
[45] Feb. 15, 1972

[54] THYRISTOR GATE PULSE GENERATOR

[72] Inventor: Eugene M. Perrin, Cheektowaga, N.Y.
[73] Assignee: Westinghouse Electric Corporation, Pittsburgh, Pa.
[22] Filed: Jan. 9, 1970
[21] Appl. No.: 1,599

[52] U.S. Cl. ..................307/252 W, 307/240, 307/242, 307/252 P, 307/261, 328/26, 328/60
[51] Int. Cl. ............H03k 5/153, H03k 17/08, H03k 17/72
[58] Field of Search ............307/252 R, 252 A, 252 G, 252 J, 307/252 K, 252 L, 252 M, 252 N, 252 P, 252 Q, 252 UA, 239, 240–244, 235, 261, 262, 268, 284; 328/26, 32, 60, 61; 323/22 SC

[56] References Cited

UNITED STATES PATENTS 3,299,341  1/1967  Corey...........................307/252 P X
3,333,114  7/1967  Molnar et al. ........................307/241
3,386,037  5/1968  Yamada............................307/284 X

*Primary Examiner*—Stanley D. Miller, Jr.
*Assistant Examiner*—L. N. Anagnos
*Attorney*—F. H. Henson, C. F. Renz and M. P. Lynch

[57] ABSTRACT

The invention comprises a thyristor gate pulse generator circuit including phase shifting and pulse-shaping networks to develop controlled firing pulses for single converter operation, or dual converters operating in the circulating current mode.

A controlled DC voltage is compared with an AC input with the intercepts determining the firing angle of the thyristors. The use of a single AC voltage and both positive and negative intercepts insures inherently the sum of forward and reverse thyristor gating angles is maintained 180°.

The AC input to the comparator is the cosine of the line voltage applied to the converters to achieve symmetry of operation around 90°.

6 Claims, 3 Drawing Figures

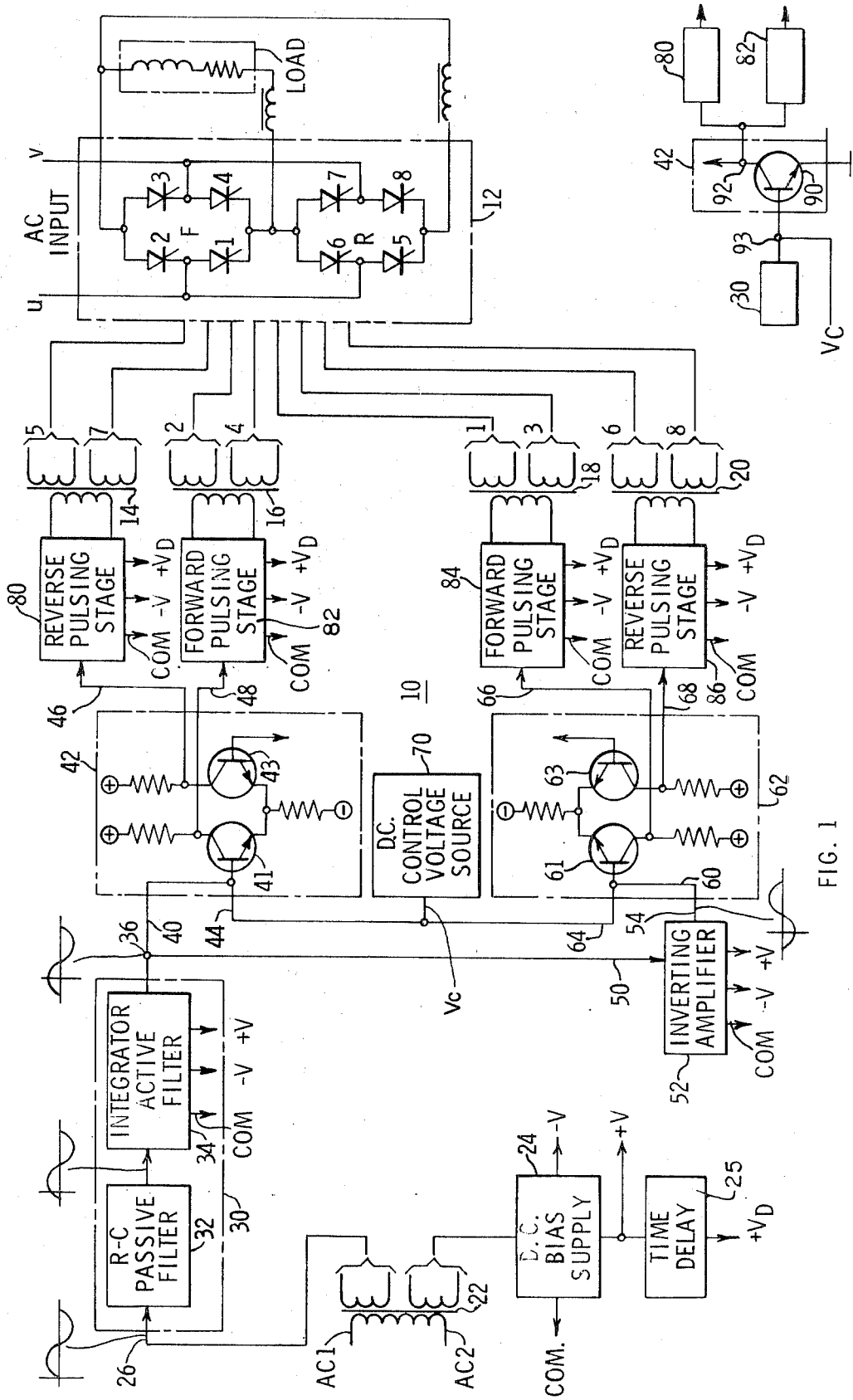

THYRISTOR GATE PULSE GENERATOR

BACKGROUND OF THE INVENTION

This invention relates in general to electrical power conversion systems incorporating gate controlled conduction devices of the type including thyristors, silicon controlled rectifiers (SCRs), etc., and in particular to a gate pulse generator circuit for controlling the gating, or firing, of these gate controlled conduction devices.

As is known, a thyristor power converter is an apparatus which by means of phase-controlled gating of the thyristors, and alternating current supply line voltage is converted into an adjustable direct current voltage which is available for application to a load. This process is known as rectifying. Inversely, a direct current voltage can be converted back into an alternating current voltage; and this mode of operation is called inverting.

A single converter of the type described above is a unidirectional current source. If a bidirectional current is required, as in the case of a DC motor requiring torque reversal, a second converter can be added and connected back-to-back thus forming a bidirectional or dual converter. The converters of the dual converter can be referred to as a forward converter and a reverse converter. Each converter of the dual converter includes thyristors to support both rectifying and inverting modes of operation.

A gate pulse generator circuit is employed to schedule the gating of the respective converters to establish the required DC load voltage.

When operating a dual converter in the circulating current mode it is necessary for the average output voltage to be zero and, therefore the transfer curves of the two converters to be matched perfectly. If this is not the case large DC circulating currents are likely to flow; the circulating current being limited only by reactor and transformer impedances. This occurs if the rectifying converter supplies more voltage than the inverting amplifier can absorb, i.e., $\alpha_f + \alpha_r < 180°$.

In the past two gate pulse generators were employed and it was necessary by component selection, manufacturing techniques, and elaborate testing to match all transfer characteristics to a predetermined theoretically desirable transfer curve. In addition, larger than necessary reactors and resistors were inserted in the load side of the converters to minimize the effects of mismatch.

SUMMARY OF THE INVENTION

The invention comprises a gate pulse generator developing dual converter gating pulses relative to the intercepts of an adjustable DC control voltage with an inherently generated cosine voltage waveform and the inverse of the cosine waveform.

The intercepts of the DC control signal with the positive slope of these AC voltages are employed to generate gate pulses for the thyristors of one of the converters of the dual converter, while the intercepts with the negative slope of the AC voltages are employed to generate gate pulses for the second converter.

By utilizing both the positive and negative intercepts of a control signal with a single AC voltage to produce gate pulses for both converters the mismatch of transfer curve characteristics generally encountered in the prior art are essentially eliminated.

The inherent symmetry provided by essentially a single waveform as the basis for generating gate pulses for both the forward and reversed converters of the dual converter insures that the summation of the firing angle of the forward and reverse thyristors of the respective converters will be 180°.

The invention will become more readily apparent from the following exemplary description in connection with the accompanying drawing.

DESCRIPTION OF THE DRAWING

FIG. 1 is a block diagram schematic of an embodiment of the invention;

FIG. 2 is a schematic illustration of an alternate comparator circuit for the embodiment of FIG. 1;

DESCRIPTION OF THE PREFERRED EMBODIMENT

Figure 3:
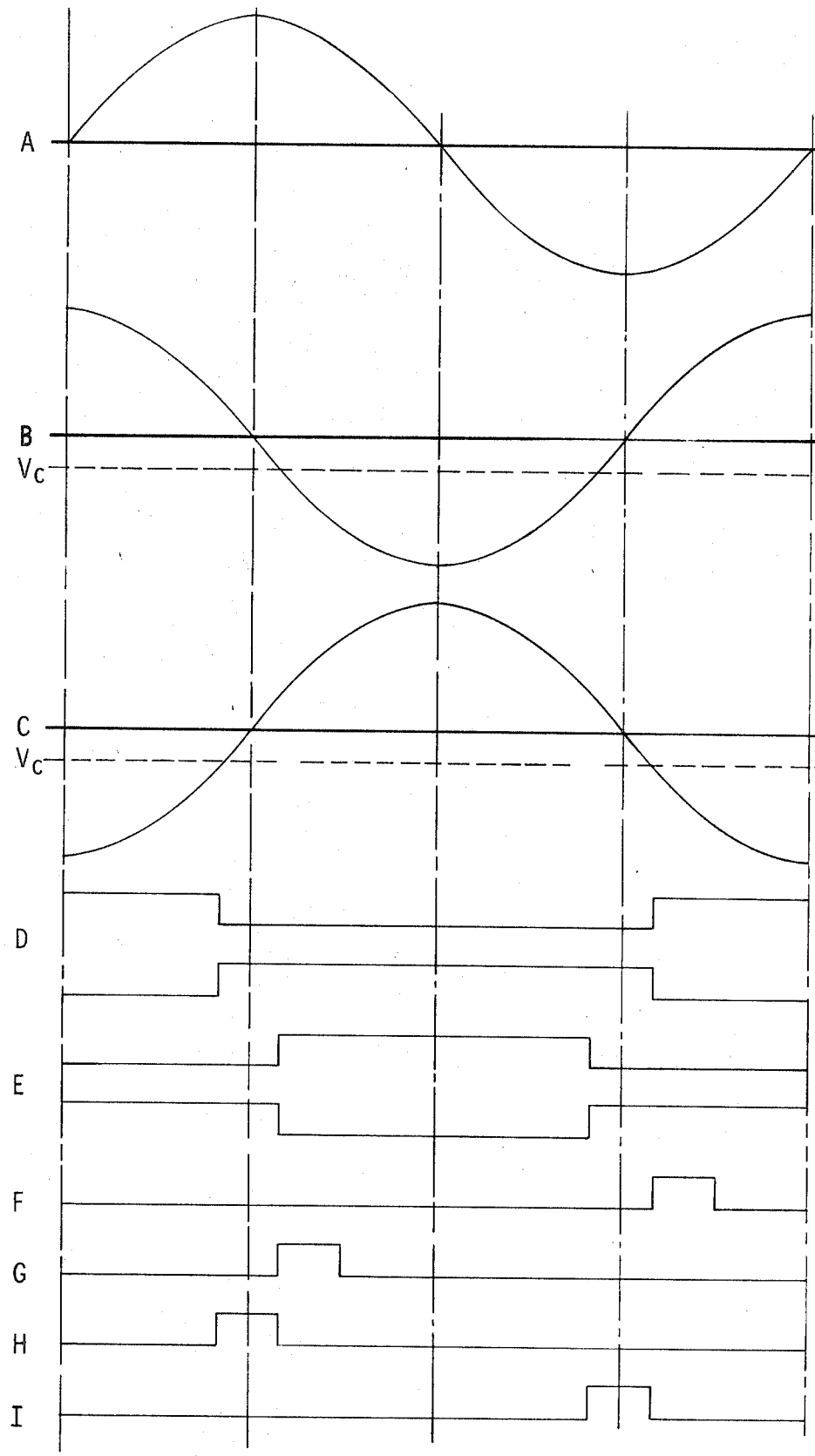
FIG. 3 comprises waveforms illustrating the operation of the embodiment of FIG. 1.

Referring to FIG. 1 there is illustrated in a block diagram schematic an exemplary embodiment of the invention comprising a pulse generator circuit 10 operatively coupled to a dual converter circuit 12 by pulse transformers 14, 16, 18 and 20. The dual converter 12 includes a forward converter F and reverse converter R. The converters F and R consist of gate control conduction devices, typically illustrated as thyristors 1–8, which respond to the controlled pulse output of the pulse generator circuit 10 by rectifying the AC input supply voltage applied at terminals U–V and supplying the resulting DC voltage to the load L.

The AC input supply voltage applied to the terminals U–V of the dual converter circuit 12 is likewise applied to the stepdown transformer 22 which provides an AC input voltage for the DC power supply 24 and a sinusoidal voltage waveform at the input 26 of the pulse-generator circuit 10.

A phase-shifting network 30, including a passive R–C filter circuit 32 and an active filter circuit 34, shifts the sinusoidal input voltage waveform approximately 90° hence the output at terminal 36 is the cosine of the sinusoidal input waveform. The combination of the passive filter circuit 32, which develops a phase shift of approximately 3°–5°, and the integrator circuit 34, which develops a phase shift of approximately 85°–88, provides accurate, inexpensive, low-loss phase-shifting network. This contrasts with the precision component requirements and high losses exhibited by filter circuits utilizing only passive circuit elements.

The cosine voltage waveform developed at the output terminal 36 is applied to the input terminal 40 of a comparator circuit 42 as well as to the input 50 of an inverting amplifier 52. The inverting amplifier 52 develops a voltage waveform at the output terminal 54 which is the inverse of the cosine voltage waveform developed by the phase shifting network 30. The inverted cosine voltage waveform is applied to the input terminal 60 of a comparator circuit 62. A DC control voltage source 70 supplies a second input voltage signal, $V_c$, to the input terminals 44 and 64 of the comparator circuit 42 and 62 respectively.

The comparator circuit 42 responds to the input voltage signal by generating a change in voltage condition of the output terminals 46 and 48 when the summation of the input cosine voltage waveform and the input control voltage signal $V_c$ equals zero. The change in output voltage condition at the comparator circuit terminals 46 and 48 initiates the development of gate pulse by the pulsing stages 80 and 82 which are subsequently coupled through pulse transformers 14 and 16 respectively to the dual converter 12. The gate pulses developed by pulsing stage 80 control the firing of thyristors 5 and 7 of the reverse converter R while the gate pulses developed by the pulsing stage 82 control the firing of thyristors 2 and 4 of the forward converter F.

Similarly the comparator circuit 62 responds to the input voltage signals applied at input signals 60 and 64 by generating a change in output voltage conditions at the output terminals 66 and 68 when the summation of the inverted cosine voltage waveform and the DC control voltage signal $V_c$ equals zero. The change in output voltage condition at the converter signal output terminals 66 and 68 initiates the scheduled development of gate pulses by the pulsing stages 84 and 86 respectively which are subsequently coupled to the pulse transformers 18 and 20 respectively to control the firing of forward converter thyristors 1 and 3 and reverse converter thyristors 6 and 8.

Comparator circuits 42 and 62 as well as pulsing stages 80–86 represent well-known state of the art circuits which can be implemented to any one of several circuit arrangements.

In its simplest form a comparator circuit could be implemented as illustrated in FIG. 2 wherein a single transistor switch 90 is utilized to develop opposite polarity voltage conditions at the collector output 92 in response to zero and nonzero summation of the input voltage signals at the base input 93. The circuitry of the pulsing stages associated with this comparator circuit would be different for the forward and reverse converter circuits inasmuch as the reversing pulsing stage 8 would be responding to a comparator output voltage condition of one polarity and the forward pulsing stage 82 would be responding to a comparator output voltage condition of the opposite polarity.

This is contrasted to the differential comparator circuitry represented by the transistors 41 and 43 of the comparator circuit 42 and transistors 61 and 63 of the comparator circuit 62. Transistors 43 and 63 operate as slave transistors in that their conduction condition is dependent on the conduction condition of transistors 41 and 61 respectively. The advantages of the differential comparator circuit include the development of output voltage condition of the same polarity being alternately transmitted from the output terminals 46 and 48 to the pulsing stages 80 and 82 respectively. This permits the use of identical pulse stages for generating thyristor firing pulses for both the forward and reverse converters of the dual converter 12. An additional advantage is the inherent temperature compensation provided by a differential circuit.

The operation of the pulse generator circuit 10 in developing thyristor gate pulses for the scheduled firing of thyristors of the dual converter 12 is illustrated by the waveforms of FIG. 3.

In FIG. 3, waveform A represents the sinusoidal input voltage supply applied to the dual converter 12 and the transformer 22. Waveform B represents a cosine voltage waveform developed by the phase shift network 30 at the output terminal 36. Waveform C represents the inverse of the cosine voltage waveform as developed by the inverting amplifier 52 at the output terminal 54. The square waves D and E represent changes in the output conditions manifested by comparator circuits 42 and 62 respectively in response to zero summations of the voltage signals applied to the inputs of the comparator circuits. The conduction of transistors 41 and 43 of the comparator circuit 42 in response to the cosine voltage waveform B input and a preselected DC control voltage signal $V_c$ is illustrated in waveform E. The value of DC voltage control signal $V_c$ determines the schedule of firing of the thyristors of the dual converter circuit 12 by dictating at what point of the waveforms B and C the comparator circuits 42 and 62 change output voltage conditions. The changes in comparator circuit output voltage conditions correspond to the intercepts of the control voltage $V_c$ and the waveforms B and C; the intercepts representing zero summation of the input voltage signal to the comparator circuits 42 and 62.

Waveforms F and G represent the gate pulse outputs from the forward converter pulsing stage 82 and 84.

Waveforms H and I represent the gate pulse outputs from the reverse converter pulsing stages 80 and 86.

Utilization of both the positive and negative intercepts of the cosine and inverted cosine waveforms with the DC control voltage to generate forward and reverse converter thyristor firing pulses provides inherent matching between the transfer curves of the forward and reverse converters. The utilization of essentially the same voltage waveform to initiate firing pulses for both the reverse and forward converter circuits provides essentially that the sum of the forward converter firing angles and the reverse converter firing angles is 180°. Furthermore, operational symmetry is assured in that the DC control voltage signal $V_c$ intercepts the waveforms B and C at the same point in successive cycles of the input waveforms.

A time delay circuit 25 is illustrated in FIG. 1 as being coupled to the output of the DC voltage supply 24. The time delay circuit 25 is utilized to delay the DC voltage $V_D$ to the pulsing stages 80–86 hence generation of gate pulses is delayed for sufficient duration to permit the simultaneous application of AC power to both dual converter circuit 12 and the transformer 22 without subjecting the dual converter circuit 12 to uncontrolled thyristor firing device during startup.

I claim:

1. In a dual converter circuit including a sinusoidal input voltage source, the dual converter providing current flow to a load during both the positive and negative half-cycles of the AC voltage source, said dual converter including a forward and a reverse converter, and a gate pulse generator providing controlled firing of said converters to control the level of DC power developed at the load, said gate pulse generator comprising, a phase-shifting filter means having an input and an output, said input being operatively connected to said sinusoidal input voltage source, said filter means generating a cosine voltage waveform representation of the sinusoidal input voltage at said output, an inverting means having an input and an output, said input being operatively connected to the output of said filter means, said inverting means generating an output waveform which is the inverse of said cosine voltage waveform, an adjustable DC voltage source, a first comparator circuit means having a first input and a second input and an output, said first input being operatively connected to the output of said filter means, said second input being operatively connected to said DC control voltage source, said first comparator circuit means generating a change condition at said output when the sum of the voltage signals at said first and second inputs is substantially zero, a second comparator circuit means having a first input and a second input and an output, said first input being operatively connected to the output of said inverting amplifier means, said second input being operatively connected to said DC control voltage source, said second comparator circuit means generating a change in output voltage at said output when the sum of the voltage signals at said first and second inputs is substantially zero, and forward and reverse converter pulsing stages responding to the change in output voltage conditions of said first and second comparator circuits to generate converter firing pulses, the value of the DC control voltage determining the firing angle of said forward and reverse converters with the summation of the forward and reverse firing angles being substantially 180°.

2. A dual converter circuit as claimed in claim 1 wherein said pulsing stages include forward and reverse thyristor pulsing stages operatively connected to the output of each of said first and second comparator circuit means to control the firing angle of reverse and forward thyristors comprising the converters of said dual converter circuit.

3. A dual converter circuit as claimed in claim 1 including pulse transformers coupling the output of said pulsing stages to said converters.

4. A dual converter circuit as claimed in claim 1 wherein said phase-shifting filter means comprises a passive filter and an active filter.

5. A dual converter circuit as claimed in claim 4 wherein said active filter provides a waveform phase shift of approximately 85°.

6. A dual converter circuit as claimed in claim 1 including a time delay circuit for delaying the generation of converter gate pulses for a sufficient duration to permit the simultaneous application of the sinusoidal input voltage to both the converter circuit and the phase-shifting filter means.

* * * * *